United States Patent [19]

Blakeley

[11] 3,999,785
[45] Dec. 28, 1976

[54] MECHANICAL PIPE OUTLET
[75] Inventor: James Blakeley, Thornhill, Canada
[73] Assignee: Victaulic Company of Canada, Ltd., Rexdale, Canada
[22] Filed: Nov. 18, 1974
[21] Appl. No.: 524,660
[52] U.S. Cl. .............................. 285/111; 285/150; 285/197; 285/379
[51] Int. Cl.² .......................................... F16L 41/00
[58] Field of Search .......... 285/197, 198, 199, 367, 285/111, 373, 150, 379; 24/284

[56] References Cited
UNITED STATES PATENTS

| 896,333 | 8/1908 | Smith | 285/373 X |
| 1,178,234 | 4/1916 | Hayden | 285/199 |
| 1,831,641 | 11/1931 | Skinner | 285/197 |
| 2,459,251 | 1/1949 | Stillwagon | 285/373 |
| 2,512,009 | 6/1950 | Bober | 285/197 |
| 3,251,615 | 5/1966 | Short | 285/367 X |
| 3,362,730 | 1/1968 | St. Clair et al. | 285/197 X |
| 3,489,441 | 1/1970 | Malcolm | 285/197 |
| 3,792,879 | 2/1974 | Dunmire et al. | 285/197 |

FOREIGN PATENTS OR APPLICATIONS

| 1,486,484 | 5/1967 | France | 285/197 |
| 268,923 | 4/1927 | United Kingdom | 285/111 |
| 1,010,832 | 11/1965 | United Kingdom | 24/284 |

Primary Examiner—Thomas F. Callaghan
Attorney, Agent, or Firm—Brooks Haidt Haffner & Delahunty

[57] ABSTRACT

Branch pipes are secured to main pipes mechanically by means fitted about the main pipe at a hole in the pipe wall. Two sections of the outlet contact the main pipe around its entire circumference, and either or both sections can have a spigot for fitting within a hole through the pipe wall to align the branch accurately. The housing sections have means for easy bolted assembly and for accurately positioned reception of a pressure sensitive gasket.

4 Claims, 9 Drawing Figures

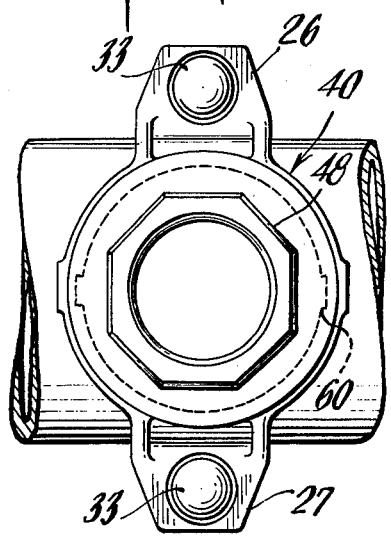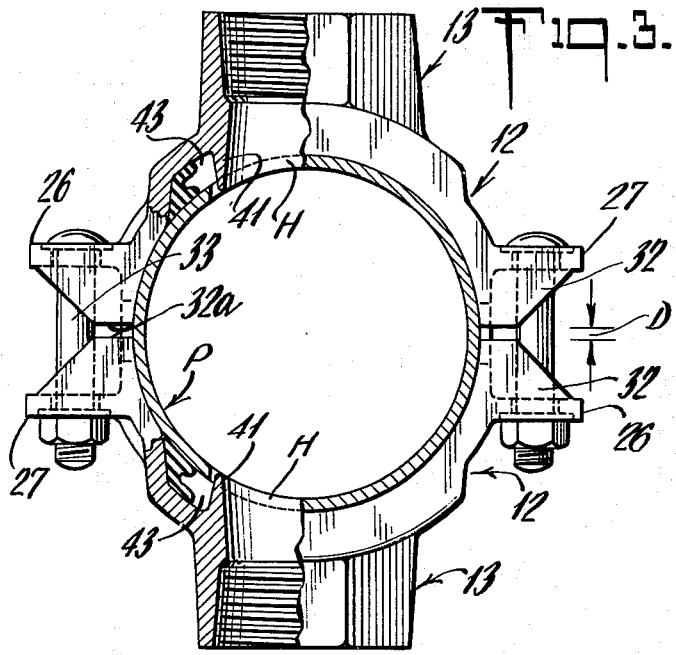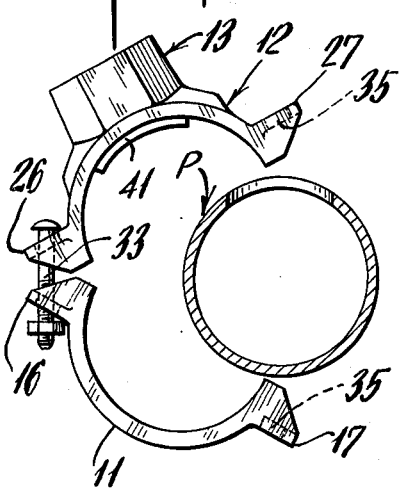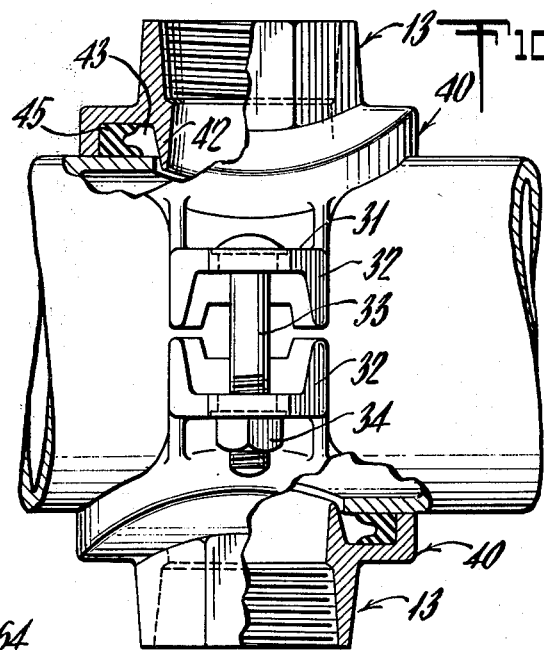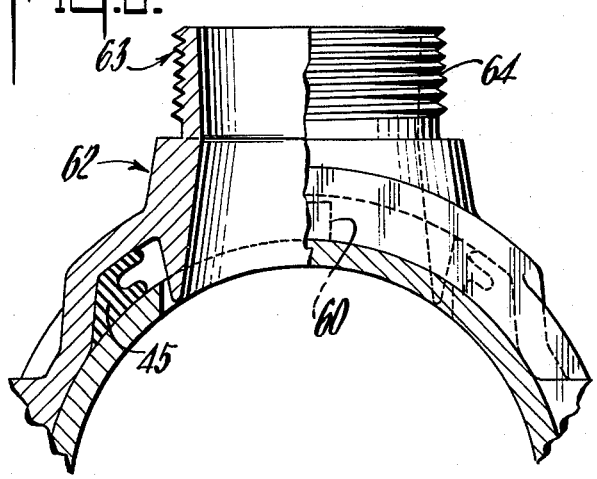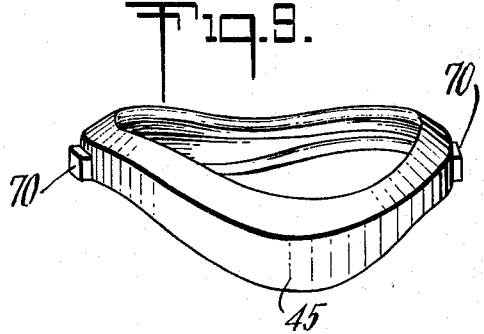

MECHANICAL PIPE OUTLET

BACKGROUND OF THE INVENTION

1. Field of the Invention

The invention relates to the interconnection of pipes, and more particularly to mechanical means for connecting branch pipes to a main pipe.

2. Background of the Invention

A smaller or branch pipe is often connected to extend perpendicularly from a larger or main pipe. The main pipe may have a vertical, horizontal or other orientation.

Conventional branch pipe joints have been provided by welding-in of another piece of pipe or adapter, known in the piping industry as "stubbing-in", or by using a weld saddle; or further by adding a separate fitting such as a "Tee", which may be of the mechanical or weld type. Fittings called "Crosses" are also known for joining two perpendicular branches, running in opposite directions, to a main pipe.

Such welding-in or assembly of piping with Tee or Cross fittings can require highly skilled labor and special equipment, and can be time consuming and expensive procedures. It is desirable to avoid these disadvantages.

The difficulties of welding have been avoided by the use of so-called mechanical "saddles" for attaching a branch pipe to a considerably larger main pipe, but such mechanical saddles have serious limitations. Their use is restricted to outlets that are small with respect to the main pipe size. These same saddles are designed for practical use only with standard or heavier wall pipe and have limited service life because of the compression type gaskets used in conjunction with them.

These saddles are usually held in place with a narrow strap(s) or "U" bolt(s) which do not act to reinforce the weakened outlet area and therefore require other means of reinforcement and/or support.

It is apparent that existing mechanical saddle designs do not aid in positive alignment or serve to prevent rotation of the outlet, necessitated by modern pressure piping methods.

Conventional branch and cross joint assembly devices and methods are not entirely suitable for the lighter wall thicknesses and lower strength materials used in modern piping, and are limited with respect to the ratio of diameters of main to branch pipes.

SUMMARY OF THE INVENTION

The mechanical outlet of the present invention overcomes the disadvantages of conventional branch and cross pipe connections, while providing for ease of assembly and positive sealing of joints. Standard or lightwall pipe can be jointed, and the mechanical outlet reinforces the pipe at the joint. The branch pipe can be of fairly large size with respect to the main pipe. Means are provided for sure alignment and location of a branch with respect to a main pipe without the employment of very highly skilled labor.

Generally, the mechanical outlet device of the invention comprises two sections which are bolted together to encircle a main pipe. One or both of the sections has an internally extending spigot to fit within a hole cut in the main pipe and an outlet portion extending from the spigot to interconnect with a branch pipe. These sections are so shaped as to support and reinforce the pipe wall in the area weakened by the outlet hole. Around the spigot there is a gasket-receiving recess to hold a pressure sensitive gasket for durable leak-proof sealing of the joint.

The opposed ends of the two sections of the outlet are bolted together when the outlet is assembled around a pipe. To facilitate positioning of the sections with respect to each other a key and recess arrangement is provided. This permits assembly without misalignment of the sections.

The bolt receiving pads of the outlet sections are preferably relieved at a slant toward their outer ends so that the outlet sections can be joined at one side and pivoted open to fit around a pipe and then secured in place by placement of the second bolt and tightening of the bolts.

The portion of the device to be connected with a branch pipe can have male or female threads or can be made with an external circumferential groove for quick coupling.

Because of its pipe reinforcing structure the outlet device of the invention can be used on thinner walled pipe than prior art devices. The ratio of size of the branch to the main pipe can be larger than in prior art constructions. For example, a 2½ inch branch can be connected to a 4 inch main pipe.

One particularly attractive application of mechanical outlets in accordance with the invention is in fire protection piping services, since the outlet permits branches to be located at any point along a main pipe for standpipe outlets, sprinkler branch lines and other connections or cross connections.

These and other features and advantages of the outlet device of the invention will be more fully understood from the following detailed description of preferred embodiments, especially when that description is read with reference to the accompanying figures of the drawing.

BRIEF DESCRIPTION OF THE DRAWING

FIG. 3 is a view taken along a pipe axis of a cross-connection arrangement employing two identical outlet sections according to the invention. Portions are broken away to show internal structure.

FIG. 4 is a side view of the arrangement of FIG. 3 with portions broken away.

FIG. 6 is a detail view of a male threaded outlet section according to the invention.

FIG. 7 is a plan view of an outlet device of the invention showing the octagonal shape of the outlet portion, and further illustrates key recess locating of gasket with upper section.

FIG. 8 is an illustration of the manner of assembly of the outlet device around a pipe.

FIG. 9 is a view in perspective of a gasket for the outlet device of the invention.

DETAILED DESCRIPTION OF PREFERRED EMBODIMENTS

Figure 1:
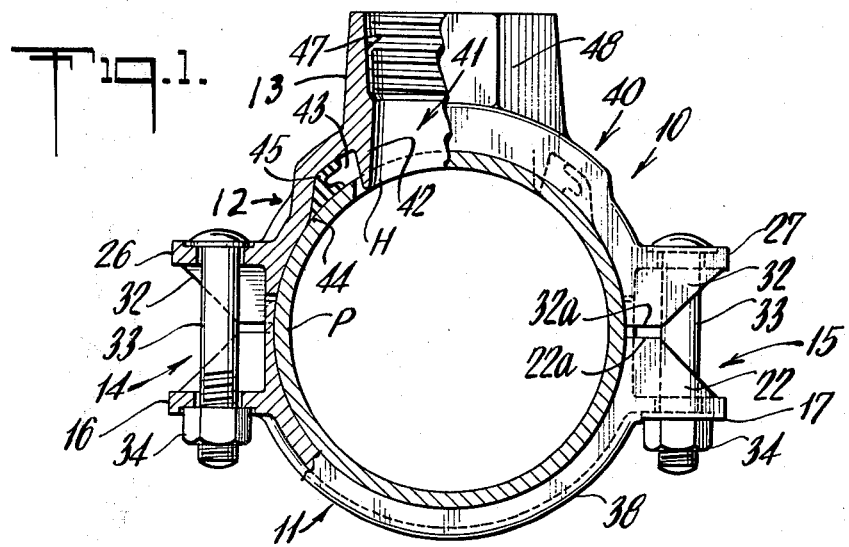
FIG. 1 is a view taken along the axis of a pipe of a mechanical outlet device of the invention partly in section and partly in elevation, with dashed lines showing some hidden structure.
Figure 2:
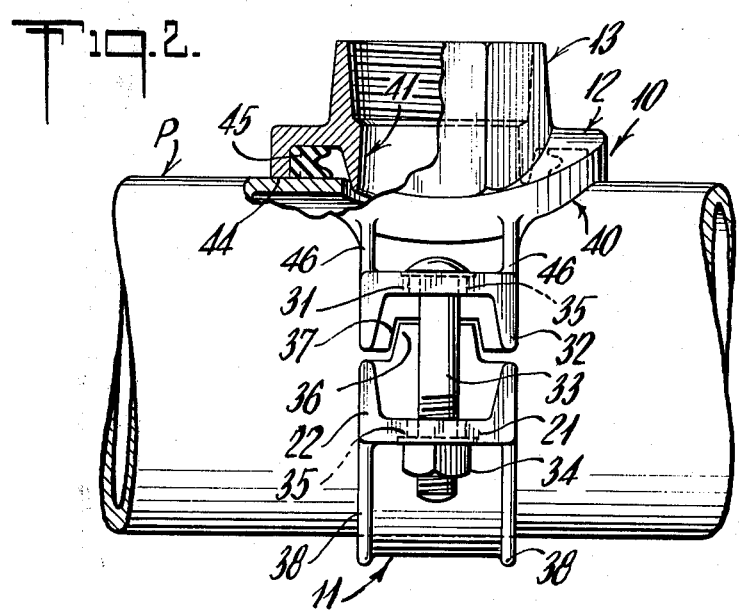
FIG. 2 is a side view of the mechanical outlet of FIG. 1 with a portion broken away to show internal structure.

A mechanical outlet device generally designated by the reference numeral 10 is shown in FIGS. 1 and 2 secured around a pipe section P. The outlet device 10 has a generally half-annular, continuous section 11 shown engaging the lower face of the pipe P and a section 12 with an outwardly extending outlet portion 13 engaging the upper face of the pipe P at the location of an outlet hole H through the wall of the pipe P. The sections 11 and 12 of the outlet device 10 can be metal castings, for example, castings of malleable iron, ductile iron, aluminum or brass would be satisfactory, but also other materials could be used including plastic moldings.

The simpler half-annular section 11 is seen to be of the appropriate size to engage the pipe P throughout its extent, and thus serves to reinforce and support the pipe wall. At its ends 14 and 15 the section 11 has outwardly extending bolt pads 16 and 17. FIG. 2 shows the bolt pad 17 to have a channnular shape with a web portion 21 and legs 22. The legs 22 slant inwardly toward the pipe P as shown in FIG. 1 at substantially a 45° angle with respect to the web portion 21.

The other bolt pad 16 of the section 11 is similar to the bolt pad 17 in structure, as are the opposed bolt pads 26 and 27 of the section 12 of the outlet device, the bolt pads 26 and 27 having web portions 31 and slanting legs 32.

The sections 11 and 12 are secured together in place around a pipe P by means of bolts 33 with nuts 34. The slanted legs 22, 32 of the opposed bolt pads permits the sections 11 and 12 to "hinge" open and "swivel" with the removal of one bolt only. The other bolt undisturbed in its pre-assembled position forms the pivot around which the hinge/swivel action takes place. FIG. 8 illustrates this stage of the assembly technique. Subsequent placement of the other bolt 33 through the bolt pads 16, 26 and tightening of the nuts 34 secures the outlet device 10 in place. Since one bolt 33 can be left secured before assembly of the outlet device 10 about a pipe, one worker can easily accomplish the installation by holding the device with one hand and placing and tightening the other bolt and nuts 33, 34 with the other hand. To further facilitate installation of the mechanical outlet device 10, the bolts 33 are preferably of the track head type, fitted through oval holes 35 of the respective bolt pads 16, 26, 17 and 27. The use of track head bolts 33 makes it possible to assemble and tighten the outlet device 10 in place with only one wrench.

Another structural feature of the sections 11 and 12 which aids in assembly by assuring good alignment is the provision of a key section 36 of generally trapezoidal shape at each of the ends 14 and 15 of the section 11 to mate with opposed recesses 37 formed between the legs 32 of the section 12 as best seen in FIG. 2. The interfitting of the key sections 36 with the recesses 37 guides the two sections 11 and 12 into proper alignment.

It has been mentioned that the section 11 is sized to embrace the pipe wall throughout its extent, substantially 180°. This reinforces and strengthens the pipe. The section 11 can itself be strengthened by reinforcing ribs 38 running from the bolt pad 16 to the bolt pad 17. As shown in FIGS. 1 and 2 such ribs 38 can be formed at both sides of the section 11 and will not interfere with the bolts 33 or nuts 34.

The section 12 of the outlet device 10 shown atop the pipe P in FIGS. 1 and 2 also embraces the wall of the pipe P throughout substantially 180° and reinforces the pipe P where reinforcement is most important—at the location of the hole H through the pipe wall. The hole H, as will be understood by those familiar with the art, is slightly larger than the diameter of the spigot 41 of the outlet device to accommodate the outlet device and to permit passage through the outlet of the desired flow to a branch pipe (not shown in the drawing). The hole H is round, i.e. the projection of a circle on the pipe wall, and need not, as in some prior art methods, be cut to exact tolerances, since the mechanical outlet of the invention accommodates reasonable roughness and even variations in diameter of the hole H which can result from the method of cutting, for example in flame cutting of holes H.

As shown in FIGS. 1 and 2, the body of section 12 is not just a semi-annular band like that of section 11, but rather has a middle portion 40 widened to the form of the projection of a circle of larger diameter than the hole H. The outlet portion 13 extends centrally outward from this widened portion 40 of the section 12 and a spigot 41 extends inwardly as shown in FIGS. 1 and 2. The spigot 41 is sized to be received within the hole H with some clearance, and is accordingly also formed as the projection of a circle with a tapered lip 42 that follows the curvature of the hole H. The spigot 41, by fitting within the hole H, accurately locates the section 12 on the pipe P, and prevents dislodgement of the outlet device 10 in service.

Surrounding the spigot 41 there is a gasket-receiving recess 43 within the middle portion 40 of the section 12. The gasket receiving recess 43, as shown in FIGS. 1 and 2, follows the curvature of the outer diameter of the pipe P, and is bounded at its inner side by the lip 42 of the spigot 41.

Outwardly of the recess 43, with respect to the hole H, the portion 40 of the section 12 is formed to securely engage the wall of the pipe P as shown at 44. It will be seen that because of the geometry of the assembly, wherein to cylinders intersect, the recess 43 and the pipe engaging area 44 of the section 12 are not of uniform cross-sectional shape but rather follow the curvature of pipe wall. However, the area within the recess 43 is sufficient throughout to hold a gasket 45, which should be a pressure sensitive gasket for sealing the connection most effectively. It will be seen that there is some clearance between the lip 42 of the spigot 41 and the edge of the hole H. This allows internal pressure to exert itself on the gasket 45. Higher internal pressure results in tighter sealing. The clearance can be small enough to prohibit the entry into the recess 43 of any particulate material from the pipe P, while still admitting fluid under pressure. The gasket 45 can be of rubber or preferably some synthetic elastomer material such as chlorinated butyl or ethylene propylene dienemonomer. Toward the bolt pads 26 and 27 from the middle portion 40 the section 12 has reinforcing ribs 46 like the ribs 38 of the section 11.

The outlet portion 13 of the device 10 is shown in FIGS. 1 and 2 to extend outwardly in the opposite direction from the spigot 41, and the section 12 can be manufactured by known casting techniques. In the embodiment of FIG. 1 this outlet portion 13 is shown formed with internal threads at 47 for threadedly receiving the external threads of the end of a branch pipe. The outside 48 of the outlet portion 13 in this embodiment is advantageously formed with an octagonal shape as shown in FIG. 7 for easy grasping while threading a branch pipe.

FIGS. 3 and 4 illustrate the use of two of the sections 12 as described with reference to FIGS. 1 and 2, to form a cross connection between a main pipe and two branches extending in opposite directions. The spigots 41 locate the two sections 12 accurately.

FIG. 3 illustrates at D variable spacing which mechanical outlets according to the invention permit to accommodate variations in outer diameter of the main pipe to which they are fitted. It has been noted that the bolt pads 16, 17, 26 and 27 are relieved for ease of assembly. It will be seen that the slanted legs 32 (and 22 in FIGS. 1 and 2) terminate in flat radial portions 32a (22a) extending radially with respect to the pipe P. These portions 32a and 22a at opposite ends of a section 12 or 11 respectively thus lie in a plane. By tightening the bolts 33 until the pipe wall is evenly engaged by outlet device sections 11 and 12 for a branch or 12 and 12 for a cross the device can accommodate the deviations in outer diameter that exist in commercially available pipe.

The cross assembly of FIGS. 3 and 4 is assembled generally in the same hinge fashion as the assembly of FIGS. 1 and 2 by first removing one bolt 33 before putting the outlet device around a pipe P.

Figure 5:
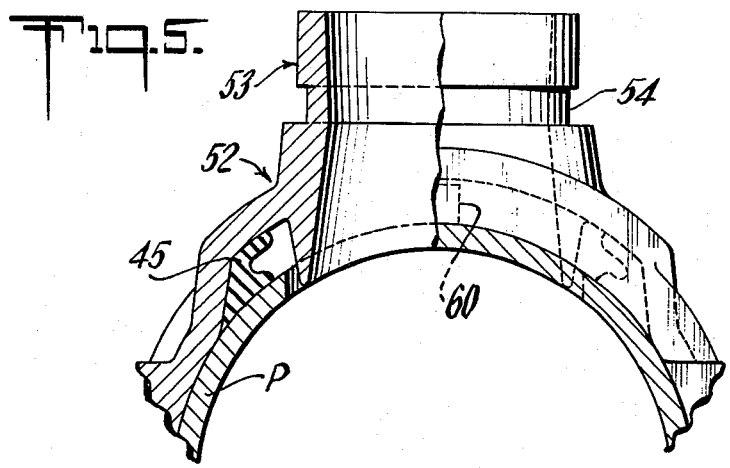
FIG. 5 is a detail illustration of a grooved embodiment of the mechanical outlet device of the invention.

FIG. 5 shows a modified outlet section 52 according to the invention, wherein the outlet portion 53 is formed with a generally rectangular circumferential groove 54 instead of having internal threads. In this embodiment the outlet portion 53 is cylindrical rather than octagonal in shape. The groove 54 permits the use of couplings of the type which engage grooved pipe ends for easy assembly without threading. Such couplings are described, for example, in U.S. Pat. Nos. 1,541,601, 2,673,102 and 2,752,174.

In the modified embodiment of FIG. 6, the outlet portion 63 has external threads 64. Except for the differences in their provisions for securing branch pipes to their outlet portions 53 and 63, the embodiments of FIGS. 5 and 6 can be the same as the section 12 described with reference to FIGS. 1-4.

FIG. 9 shows a gasket 45 having a pair of keys 70 formed to cooperate with recesses 60 formed at opposite sides of the sections 12, 52 and 62 as shown in dotted lines in FIGS. 5, 6 and 7. The interfitting relationship of the gasket keys 70 within the recesses 60 insures the proper radial position of the gasket 45 with respect to the curvatures of the matching curved surfaces of the section 12 (or 52 or 62) and the pipe surface. These keys and recesses have been omitted in the FIGS. 1-4 for clarity of illustration.

Numerous modifications, applications and substitutions of materials will suggest themselves to those familiar with piping and such alterations are considered to be within the spirit and scope of the invention.

What is claimed is:

1. A mechanical outlet device for connecting a branch pipe to main pipe at a hole through the wall of a main pipe comprising two opposed arcuate sections defining a cylindrical space therebetween for embracing the wall of a main pipe, opposed bolt pads at both ends of each of said arcuate sections, each of said bolt pads being channnular in shape and having a web portion with an oval hole therethrough and a pair of spaced leg portions extending toward opposed leg portions of an opposite bolt pad, said leg portions having slanted surfaces for permitting hinging movement of said sections for mounting the device on a pipe, bolts through said oval holes for interconnecting said opposed sections, both ends of one of said sections having a groove formed between said legs and both ends of the other section having a tongue between said legs for mating tongue and groove interfit of said section ends for accurate positioning of said sections during assembly, at least one of said sections having a radially, inwardly directed spigot means for reception within the hole of a main pipe, a gasket receiving recess surrounding said spigot means and following the curvature of said cylindrical space, and a pressure-sensitive gasket, "C"-shaped in cross-section, encompassing said spigot means within said recess for sealing under the influence of pressure from fluid in the main pipe transmitted to said gasket through clearance space between said spigot means and the hole through the pipe wall, and outlet means extending radially outward opposite said spigot means for attachment to a branch pipe.

2. The mechanical outlet device of claim 1 wherein the gasket has key means and the gasket receiving recess has corresponding key receiving means for insuring proper radial positioning of the gasket.

3. The mechanical outlet device of claim 1 wherein said tongue is generally trapezoidal in shape and the groove is of mating shape.

4. The mechanical outlet device of claim 1 wherein said bolts are track head bolts.

* * * * *